(12) United States Patent
Moyna

(10) Patent No.: US 10,988,068 B2
(45) Date of Patent: Apr. 27, 2021

(54) SHIELD ASSEMBLY FOR A DUMP BOX

(71) Applicant: John P. Moyna, Elkader, IA (US)

(72) Inventor: John P. Moyna, Elkader, IA (US)

(*) Notice: Subject to any disclaimer, the term of this patent is extended or adjusted under 35 U.S.C. 154(b) by 112 days.

(21) Appl. No.: 16/238,741

(22) Filed: Jan. 3, 2019

(65) Prior Publication Data
US 2019/0291622 A1  Sep. 26, 2019

Related U.S. Application Data

(60) Provisional application No. 62/647,409, filed on Mar. 23, 2018.

(51) Int. Cl.
*B60P 1/28* (2006.01)
*B62D 33/027* (2006.01)

(52) U.S. Cl.
CPC ............ *B60P 1/283* (2013.01); *B62D 33/027* (2013.01)

(58) Field of Classification Search
CPC .......... B60P 1/283; B60P 1/286; B62D 33/027
USPC ........ 298/17 R, 22 R, 23 R, 23 C; 296/183.2, 296/190.03; 16/445
See application file for complete search history.

(56) References Cited

U.S. PATENT DOCUMENTS

| | | | |
|---|---|---|---|
| 888,079 A * | 5/1908 | Furman | 16/445 |
| 3,833,255 A | 9/1974 | Logue | |
| 4,913,301 A * | 4/1990 | Pickler | B65F 1/122 206/515 |
| 5,498,066 A * | 3/1996 | Cuthbertson | B60P 1/26 298/23 C |
| 6,050,442 A * | 4/2000 | Wysocki | B65F 1/004 220/524 |
| 9,315,136 B2 * | 4/2016 | Kibler | B60P 1/16 |
| 2019/0263311 A1 * | 8/2019 | Robbs | B60P 1/286 |

* cited by examiner

*Primary Examiner* — Stephen T Gordon
(74) *Attorney, Agent, or Firm* — Zarley Law Firm, P.L.C.

(57) ABSTRACT

A shield assembly for the dump box of a vehicle includes a first plate connected to a front wall of a dump box. A second plate, having a center section and outer sections is pivotally connected to the first plate. A handle is pivotally connected to the top plate and is adapted to move the second plate to a raised and a lowered position and lock in a raised and a lowered position.

18 Claims, 4 Drawing Sheets

SHIELD ASSEMBLY FOR A DUMP BOX

CROSS REFERENCE TO RELATED APPLICATION

This application claims the benefit of priority from Provisional Application No. 62/647,409 filed Mar. 23, 2018, the contents of these applications are hereby incorporated by reference in their entirety.

BACKGROUND OF THE INVENTION

The present invention is directed to a shield assembly for a dump box and more particularly a shield assembly that pivots from a lowered to a raised position.

Shield assemblies are known in the art and are used during loading of a dump box to assist in meeting the rated box volume and increasing the volume of the load while at the same time protecting the cab and/or individuals from objects being thrown over the front wall of the dump box. While useful, present shield assemblies need to be removed during transport to meet jurisdictional vehicle height restrictions. Not only is it time consuming to disconnect and reconnect the shield assembly to the dump box, shield assemblies are very heavy and require more than one person or additional equipment to move.

Accordingly, a need exists in the art for an assembly that addresses these deficiencies.

An objective of the present invention is to provide a shield assembly for a dump box that does not need to be removed to meet jurisdictional vehicle height restrictions.

Another objective of the present invention is to provide a shield assembly for a dump box that pivots from a lowered to a raised position.

These and other objectives will be apparent to those having ordinary skill in the art based upon the following written description, drawings, and claims.

SUMMARY OF THE INVENTION

A shield assembly for a dump box has a first plate mounted to a top surface of a front wall of the dump box. Pivotally connected to the first plate is a second plate. The second plate has a central section positioned above a pivot axis and a pair of outer sections that extend below the pivot axis to provide a cantilever.

At least one, and preferably two, handles are pivotally connected to the second plate. The handles are adapted to raise and lower the second plate using manual force. The handles are also adapted to lock the second plate in a raised and a lowered position.

DETAILED DESCRIPTION

Figure 1:
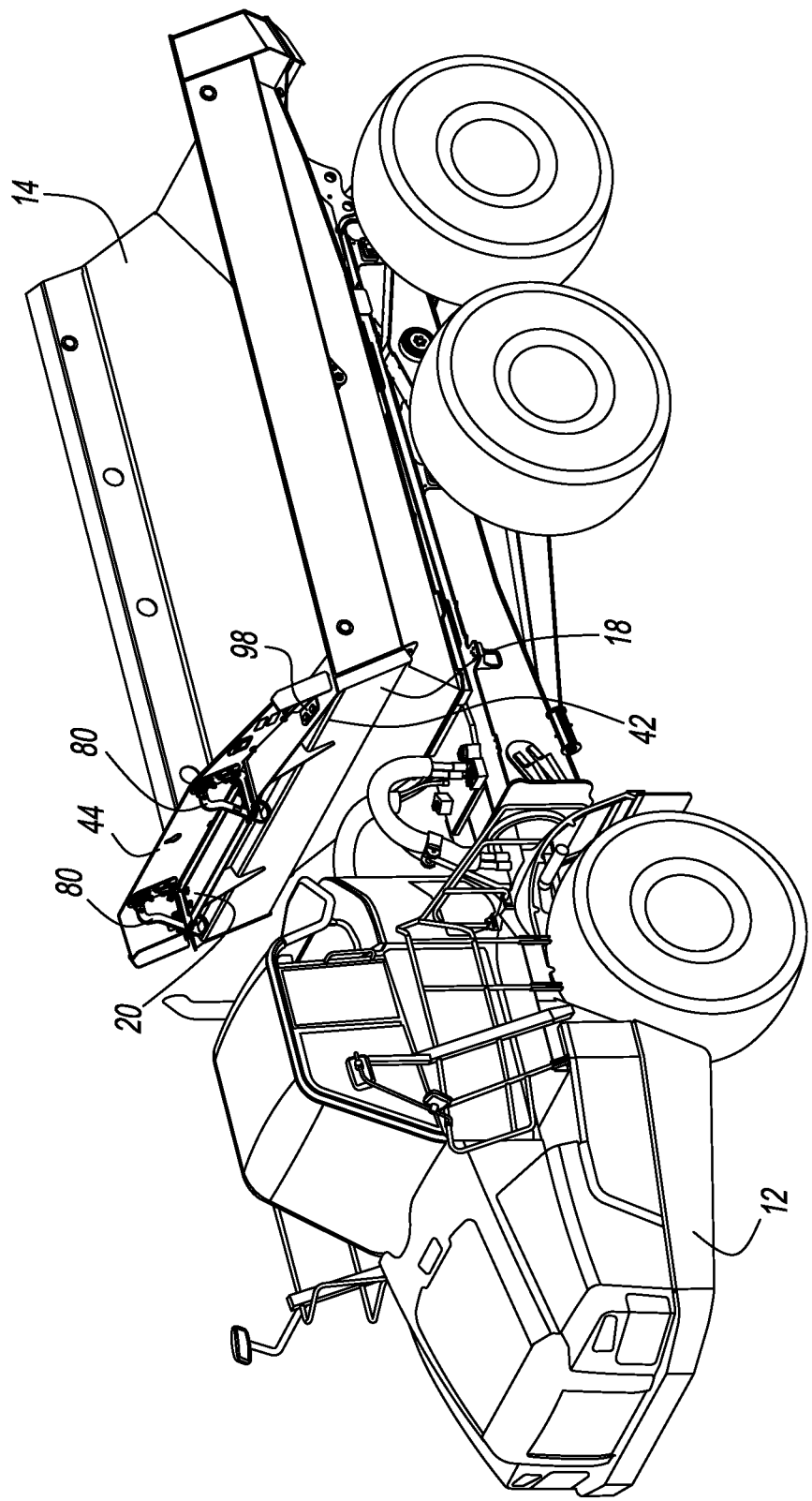
FIG. 1 is a perspective view of a shield assembly mounted to a dump box.
Figure 2:
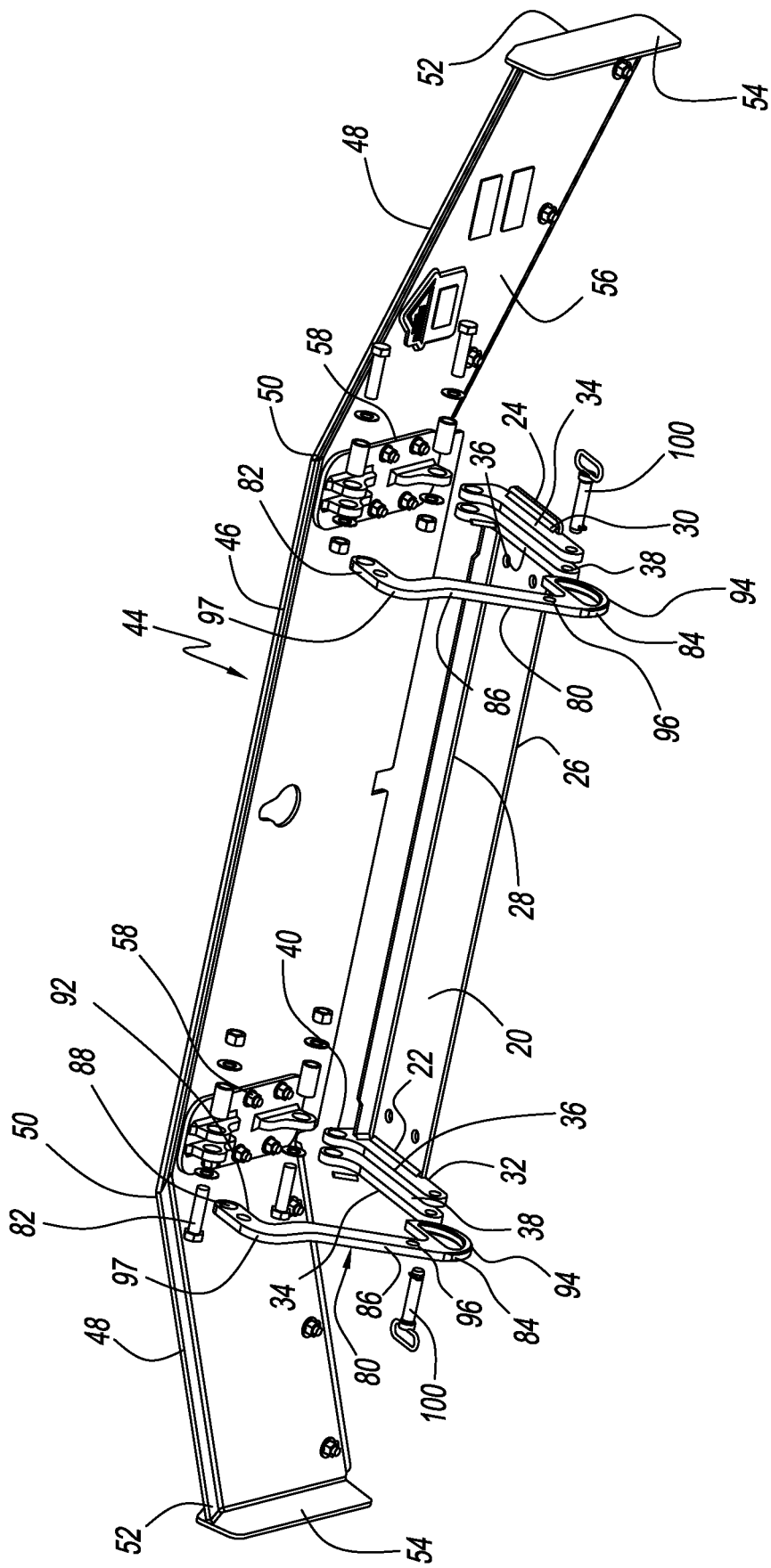
FIG. 2 is a perspective exploded view of a shield assembly.
Figure 3:
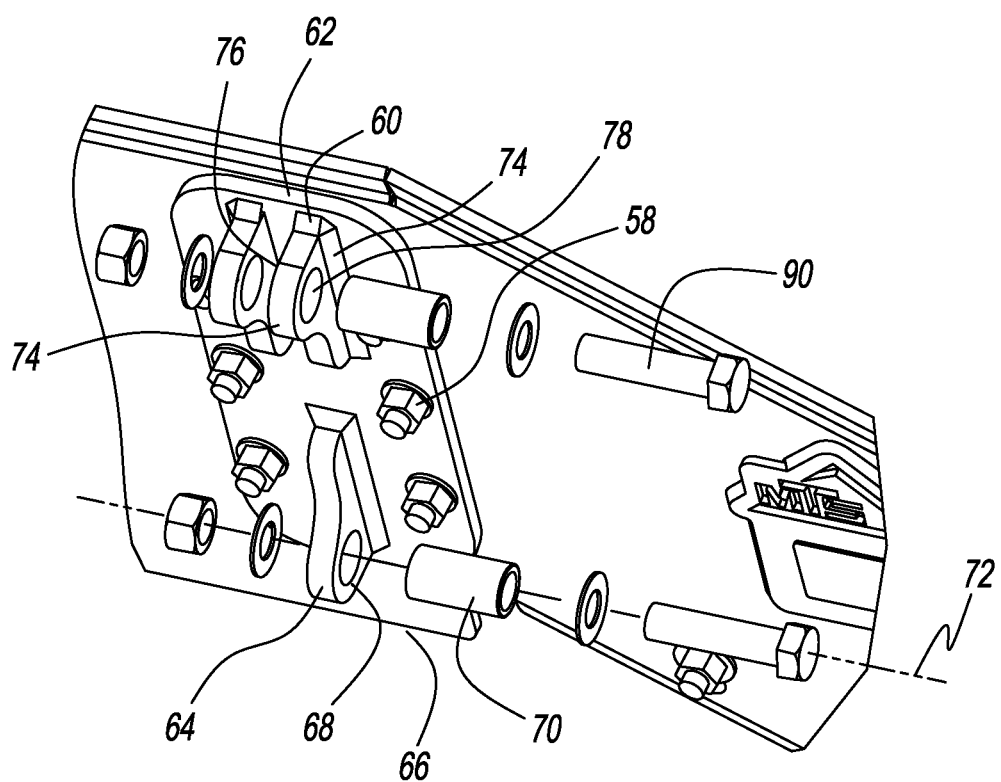
FIG. 3 is an enlarged perspective exploded view of a portion of a top plate of a shield assembly.
Figure 4:
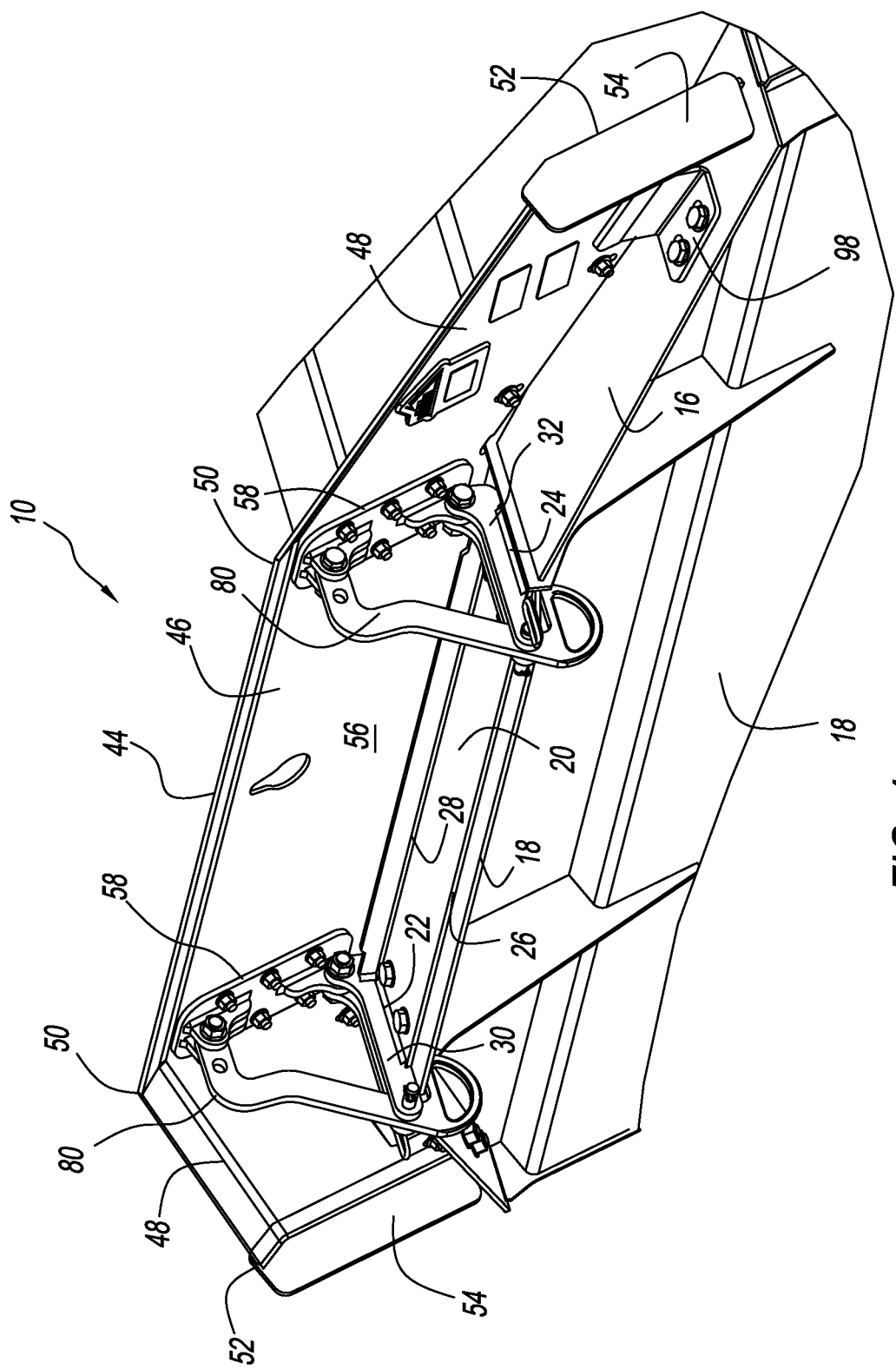
FIG. 4 is a bottom perspective view of a shield assembly mounted to a dump box.

Referring to the figures a dump box shield assembly 10 is shown for use with a vehicle 12 having a dump box 14. The vehicle 12 is of any type and the dump box 14 is of any size, shape, and structure.

Mounted to a top surface 16 of a forward wall 18 of the dump box 14 is a first plate 20. The plate 20 has a first end 22, a second end 24, a front edge 26 and a rear edge 28. Mounted on each end 22 and 24 and extending upwardly from the plate 20 are a pair of brackets 30 and 32. The brackets 30 and 32 are of any size, shape, and structure, and in the example shown, have a pair of elongated parallel spaced members 34 and 36 that form a groove 38 there between. Each end of the elongated members 34 and 36 have holes 40 that are in spaced alignment. The elongated members 34 and 36 extend from the second or rear edge 24 of the first plate 20 to beyond the first edge 22 of the first plate 20 and beyond the front edge 42 of the top surface 16 of the forward wall 18.

Pivotally connected to the first plate 20 is a second plate 44. The second plate 44 has a central section 46 and a pair of outer sections or wings 48. The central section 46 preferably has a length of the first plate 20 and a width greater than the first plate 20. The outer sections 48 extend from a fold line or bend line 50 that separates the central section 46 from the outer sections 48 to an outer end 52. The outer sections 48 bend from the plane of the central section 46 toward the top forward wall 18 of the dump box 14. A pair of flanges 54 at the ends 52 of the outer sections 48 extend perpendicular to the plane of the outer section 48 and toward the forward wall 18.

On a surface 56 of the second plate 44 facing the first plate 20 are a pair of bolt plates 58. The bolt plates 58 have a first bracket 60 at a top or first end 62 of the bolt plate 58 and a second bracket 64 at a bottom end 66 of the bolt plate 58. The second bracket is positioned and configured to fit within the groove 38 formed by the spaced elongated parallel member of brackets 30 and 32 on the first plate 20. The second brackets 64 have a hole 68 that is positioned to align with holes 40 on the spaced elongated parallel members 30 and 32 to receive a pivot pin 70 which permits the second plate 44 to pivot in relation to the first plate 20 along pivot axis 72.

The first brackets 60 have a pair of elongated members 74 in spaced parallel relation that form a groove 76 there between. The elongated members 74 each have holes 78 that are at one end of the members 74. Pivotally connected to the first bracket 60 is a handle 80.

The handle 80 is of any size, shape, and structure and has a first end 82, a second end 84, and an elongated section 86 that extends there between. The first end 82 is received within groove 76 and has a hole 88 that aligns with holes 78 to receive a pivot pin 90. Adjacent hole 88 is a second hole 92 that, as will be explained, is used to lock the shield assembly 10 in a lowered position. The second end 84 of the handle 80 has a gripping section 94 adapted to be manually gripped by the hand of an operator. Adjacent the gripping section 94 is a third hole 96 that, as will be explained, is used to lock the assembly in a raised position. The elongated section 86 preferably has an arcuate portion 97.

Attached to the top surface 16 of the front wall 18 of the dump box 14, and positioned adjacent the outer ends 52 of the outer sections 48 of the second plate 44, are a pair of stops 98. The stops 98 are of any size, shape, or structure and, in the example shown, are generally L-shaped.

In addition, and during transport, the shield assembly 10 preferably is in a locked lowered position. In the locked lowered position the second plate 44 is generally in a spaced parallel horizontal position in relation to the first plate 20. The handle 80 is also lowered so that the second hole 92 of the handle aligns with holes 40 adjacent the front wall 18 of the dump box and a locking pin 100 is received through aligned holes 40 and 92 to lock the assembly 10 in the lowered position. Preferably, because of the arcuate portion 97 of the handle 80 the gripping section 94 of the handle 80 tucks underneath the top surface 16 of the forward wall 18.

To raise the shield assembly 10 the locking pins 100 are removed from holes 40 and 92 and an operator grasps the gripping section 94 of the handle 80 and manually lifts the handle 80 and the second plate 44. Because the outer sections 48 of the second plate 44 extend below the pivot axis 72 of the shield assembly 10, the assembly is counter balanced with some of the weight of the second plate 44, namely the central section 46, above the pivot axis 72, and some weight below the pivot axis 72. The counter balance of the assembly 10 makes raising the second plate easier.

As the second plate 44 is raised the handle 80 and second plate 44 pivot about pivot pin 90 and the first plate 20 and second plate 44 pivot about pivot pin 70. The second plate 44 is raised until the second plate surface 56 engages the stops 98. Once engaged, the third hole 96 on handle 80 is aligned with holes 38 and locking pin 100 is inserted through holes 96 and 38.

From the above discussion and accompanying figures and claims it will be appreciated that the dump box shield assembly 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A shield assembly, comprising:
   a first plate mounted to a forward wall of a dump box;
   a second plate pivotally connected to the first plate and adapted to selectively move to a lowered position and a raised position;
   at least one handle pivotally connected to the second plate and configured to move the second plate to the lowered position and to the raised position using manual force; and
   wherein the at least one handle is configured to lock the second plate in the lowered position and the raised position.

2. The assembly of claim 1 wherein the second plate is counter balanced.

3. The assembly of claim 2 wherein the second plate has a pair of outer sections that extend below a pivot axis of the first plate and the second plate, and a center section above the pivot axis.

4. The assembly of claim 1 wherein a pair of stops are attached to the forward wall of the dump box.

5. The assembly of claim 1 further comprising the second plate having a central section and a pair of outer sections, wherein a length of the central section is equal to a length of the first plate, and the pair of outer sections are bent at a pair of fold lines of the central section such that the pair of outer sections extend away from the central section and towards the forward wall of the dump box.

6. The assembly of claim 5 further comprising a first flange connected to a first end of the pair of outer sections and a second flange connected to a second end of the pair of outer sections, wherein the first flange and the second flange extend perpendicularly with respect to the pair of outer sections.

7. The assembly of claim 1 further comprising the first plate having a pair of brackets, wherein each of the pair of brackets have a groove.

8. The assembly of claim 7 wherein the groove of each of the pair of brackets is formed by a pair of parallel spaced members, wherein the pair of parallel spaced members have holes that are in spaced alignment with one another.

9. The assembly of claim 7 further comprising the second plate having a pair of bolt plates, wherein each of the pair of bolt plates have a first bracket and a second bracket, wherein the first bracket and the second bracket each have a hole.

10. The assembly of claim 9 wherein the second bracket of each of the pair of bolt plates is configured to fit within the groove of one of the pair of brackets of the first plate such that the hole of the second bracket aligns with holes of parallel spaced members where fit within the groove.

11. The assembly of claim 10 further comprising a receiving pin received within the hole of the second bracket and the holes of the parallel spaced members.

12. The assembly of claim 9 further comprising the first bracket of each of the pair of bolt plates having a pair of elongated members in parallel spaced relation that form a groove therebetween, and the elongated members each having a hole.

13. The assembly of claim 1 further comprising the handle extending between a first end and a second end, and having a first hole, a second hole, and a third hole.

14. The assembly of claim 13 further comprising the handle having an elongated section that extends between the first end and the second end of the handle, wherein the elongated section is configured to tuck underneath a top surface of the forward wall when the second plate is in the lowered position.

15. The assembly of claim 13 wherein the first end of the handle is configured to be received within a groove on the second plate and retained by a pin.

16. The assembly of claim 15 wherein when the second plate is in the lowered position, the handle is received within a pair of parallel spaced members on the first plate such that the second hole of the handle aligns with a first set of aligned holes in the pair of parallel spaced members.

17. The assembly of claim 16 wherein when the second plate is in the raised position, the handle is received within the pair of parallel spaced members on the first plate such that the third hole of the handle aligns with a second set of aligned holes in the pair of parallel spaced members.

18. A shield assembly, comprising:
   a first plate mounted to a forward wall of a dump box;
   a second plate pivotally connected to the first plate and adapted to selectively move to a lowered position and a raised position;
   a handle extending between a first end and a second end, and having a first hole, a second hole, and a third hole;
   wherein the first hole and the second hole are adjacent the first end of the handle, and the third hole is adjacent the second end of the handle;
   the first end of the handle pivotally connected to the second plate;
   wherein when the second plate is in the lowered position, the handle is received within a pair of parallel spaced members on the first plate such that the second hole of the handle aligns with a first set of holes in the pair of parallel spaced members; and wherein when the second plate is in the raised position, the handle is received within the pair of parallel spaced members on the first plate such that the third hole of the handle aligns with a second set of holes in the pair of parallel spaced members.

* * * * *